(12) United States Patent
Sanada et al.

(10) Patent No.: US 9,979,016 B2
(45) Date of Patent: May 22, 2018

(54) NEGATIVE ELECTRODE ACTIVE MATERIAL FOR ELECTRIC DEVICE

(71) Applicant: NISSAN MOTOR CO., LTD., Kanagawa (JP)

(72) Inventors: Takashi Sanada, Yokohama (JP); Wataru Ogihara, Zushi (JP); Manabu Watanabe, Yokosuka (JP); Atsushi Ito, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 175 days.

(21) Appl. No.: 14/352,279

(22) PCT Filed: Oct. 1, 2012

(86) PCT No.: PCT/JP2012/075391
§ 371 (c)(1),
(2) Date: Apr. 16, 2014

(87) PCT Pub. No.: WO2013/058091
PCT Pub. Date: Apr. 25, 2013

(65) Prior Publication Data
US 2014/0272589 A1 Sep. 18, 2014

(30) Foreign Application Priority Data
Oct. 17, 2011 (JP) .................. 2011-227860

(51) Int. Cl.
*H01M 4/02* (2006.01)
*H01M 4/38* (2006.01)
*H01M 10/0525* (2010.01)

(52) U.S. Cl.
CPC ............ *H01M 4/38* (2013.01); *H01M 4/386* (2013.01); *H01M 10/0525* (2013.01);
(Continued)

(58) Field of Classification Search
None
See application file for complete search history.

(56) References Cited

U.S. PATENT DOCUMENTS 8,143,143 B2   3/2012   Buchine et al.
8,791,449 B2   7/2014   Buchine et al.
(Continued)

FOREIGN PATENT DOCUMENTS

CN   101841035 A   9/2010
CN   102084467 A   6/2011
(Continued)

OTHER PUBLICATIONS

Communication and extended European search report, dated Feb. 24, 2015, from the corresponding European patent application No. 12841333.3.
(Continued)

*Primary Examiner* — Maria Laios
(74) *Attorney, Agent, or Firm* — Young Basile Hanlon & MacFarlane, P.C.

(57) ABSTRACT

A negative electrode active material for an electric device according to the present invention includes crystalline metal having a structure in which a size in a perpendicular direction to a crystal slip plane is 500 nm or less. More preferably, the size in the perpendicular direction to the crystal slip plane is controlled to become 100 nm or less. As described above, a thickness in an orientation of the slip plane is controlled to become sufficiently small, and accordingly, micronization of the crystalline metal is suppressed even if breakage occurs from the slip plane taken as a starting point. Hence, a deterioration of a cycle lifetime can be prevented by applying the negative electrode active material for an electric device, which is as described above, or a negative
(Continued)

electrode using the same, to an electric device, for example, such as a lithium ion secondary battery.

10 Claims, 6 Drawing Sheets

(52) U.S. Cl.
CPC .............. *H01M 2004/021* (2013.01); *H01M 2004/027* (2013.01); *H01M 2220/20* (2013.01); *Y02E 60/122* (2013.01)

(56) References Cited

U.S. PATENT DOCUMENTS

| | | | |
|---|---|---|---|
| 2004/0062990 A1* | 4/2004 | Shimamura | H01M 4/366 |
| | | | 429/218.1 |
| 2007/0172732 A1 | 7/2007 | Jung et al. | |
| 2009/0202911 A1 | 8/2009 | Fukuoka et al. | |
| 2009/0256134 A1* | 10/2009 | Buchine et al. | 257/9 |
| 2009/0305129 A1 | 12/2009 | Fukui et al. | |
| 2010/0178565 A1 | 7/2010 | Green | |
| 2010/0233539 A1 | 9/2010 | Green et al. | |
| 2010/0297502 A1 | 11/2010 | Zhu et al. | |
| 2011/0117436 A1* | 5/2011 | Ma | B82Y 30/00 |
| | | | 429/231.8 |
| 2012/0301785 A1 | 11/2012 | Buchine et al. | |
| 2014/0335412 A1 | 11/2014 | Buchine et al. | |

FOREIGN PATENT DOCUMENTS

| | | |
|---|---|---|
| JP | 2007194204 A | 8/2007 |
| JP | 2009524264 A | 6/2009 |
| JP | 2009212074 A | 9/2009 |
| JP | 2010533637 A | 10/2010 |
| JP | 2011523902 A | 8/2011 |
| WO | 2007114168 A1 | 10/2007 |
| WO | 2011041468 A1 | 4/2011 |

OTHER PUBLICATIONS

Zhipeng Huang et al.: "Metal-Assisted Chemical Etching of Silicon: A Review", Adv. Mater., vol. 23, Sep. 21, 2010 (Sep. 21, 2010), pp. 285-308, XP002735507.

T. Ripenbein et al.: "Novel Porous-Silicon Structures for 3D-Interlaced Microbatteries", Electrochimica Acta, vol. 56, Jan. 20, 2009 (Jan. 20, 2009), pp. 37-41, XP002735508.

K. Peng, et al., "Silicon nanowires for rechargeable lithium-ion battery anodes", Applied Physics Letters, vol. 93, (Jul. 23, 2008), pp. 033105-1-033105-3. [DOI: 10.1063/1.2929373].

* cited by examiner

NEGATIVE ELECTRODE ACTIVE MATERIAL FOR ELECTRIC DEVICE

CROSS REFERENCE TO RELATED APPLICATION

The present application claims priority to Japanese Patent Application No. 2011-227860, filed Oct. 17, 2011 and incorporated herein in its entirety.

TECHNICAL FIELD

The present invention relates to a negative electrode active material, for example, which is used for a secondary battery suitably used for a power supply for driving a motor of an electric vehicle (EV), a hybrid electric vehicle (HEV) or the like, or is used for an electric device represented by a capacitor and the like. Moreover, the present invention relates to a negative electrode and an electric device, each of which uses this.

BACKGROUND

In recent years, as countermeasures against the air pollution and the global warming, a variety of countermeasures for a reduction of the $CO_2$ emission amount have been taken. In particular, in the automobile industry, a reduction of the $CO_2$ emission amount by introduction of an electric vehicle and a hybrid electric vehicle has been expected. As a power supply for driving a motor of each of these vehicles, development of a high-performance secondary battery has been advanced. In particular, the secondary battery as described above is required to have a high capacity and to be excellent in cycle characteristics, and accordingly, a lithium ion secondary battery having high theoretical energy has attracted attention among a variety of such secondary batteries.

In order to increase an energy density in the lithium ion secondary battery as described above, it is necessary to increase an amount of electricity stored per unit mass of each of a positive electrode and a negative electrode. Then, in order to satisfy such a requirement, it is extremely important to select an active material of each of the electrodes. Among such active materials, a variety of materials are used as a material that composes the negative electrode active material. For example, in Japanese Unexamined Patent Application Publication No. 2007-194204, it is disclosed to use crystalline metal, which is represented by silicon (Si), as a type of the negative electrode active material.

SUMMARY

However, the negative electrode active material containing the crystalline metal like silicon as a main component has had a large capacity, and meanwhile, has had a defect that pulverization thereof resulting from breakage of active material particles, which is caused by a volume change of the active material particles at a time of occluding lithium (Li), causes a deterioration of current collection property. Therefore, the negative electrode active material has had a problem that a cycle lifetime thereof is short, and it has been a challenge to solve the problem as described above. Note that the negative electrode active material described in the Japanese Unexamined Patent Application Publication No. 2007-194204 has a form in which an amorphous silicon thin film is dotted with crystalline silicon, and further, a crystal size of the crystalline silicon is less than 5 nm. Moreover, from a viewpoint of a physical common sense of a crystal growth mechanism of the silicon, the above-described crystalline silicon particles have the same size three-dimensionally. That is, the silicon particles can be said to be "isotropic particles".

The present invention has been made in order to solve the problems, which are as described above, in the conventional negative electrode material using the crystalline metal like the silicon. Then, it is an object of the present invention to provide a negative electrode active material for an electric device, which is provided with an excellent cycle lifetime. Moreover, it is another object of the present invention to provide a negative electrode and an electric device, for example, a lithium ion secondary battery, to which the negative electrode active material as described above is applied.

A negative electrode active material for an electric device according to an aspect of the present invention includes crystalline metal having a structure in which a size in a perpendicular direction to a crystal slip plane is 500 nm or less.

Moreover, a negative electrode for an electric device according to an aspect of the present invention includes the negative electrode active material for an electric device according to the present invention. Furthermore, an electric device according to an aspect of the present invention includes the negative electrode active material for an electric device according to the present invention or the negative electrode for an electric device according to the present invention. Note that a lithium ion secondary battery can be defined as a representative example of the electric device.

DESCRIPTION OF EMBODIMENTS

A description is made below in detail of a negative electrode active material for an electric device, a negative electrode for an electric device and an electric device according to an embodiment of the present invention. Note that, in this specification, "%" represents a mass percentage unless otherwise specified. Moreover, dimensional ratios in the drawings are exaggerated for convenience of explanation, and are sometimes different from actual ratios.

Figure 1:
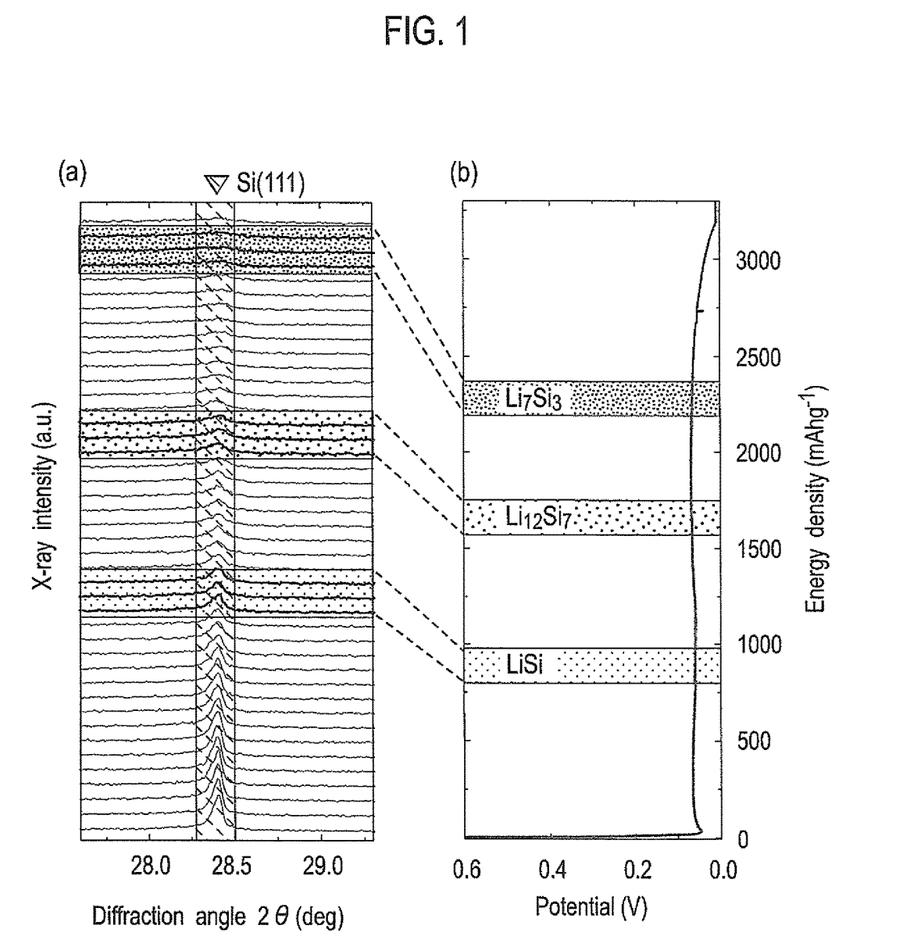
FIG. 1(a) is a graph showing changes of an X-ray diffraction pattern on slip planes of silicon in a charge process.
FIG. 1(b) is a graph showing a charge curve of the silicon.

FIG. 1 shows a state of changes in a charge process of a (111) crystal plane as a slip plane of silicon by X-ray diffraction measurement.

As an active material to be subjected to the X-ray diffraction measurement, crystalline silicon having a crystal particle size of 45 µm was used. Then, the active material concerned, a conductive assistant (carbon black), and a binder (polyvinylidene fluoride) were mixed with one another in a mass ratio of 80:5:15, and a mixture thus obtained was diluted with N-methyl-2-pyrrolidone (NMP), whereby slurry was prepared. Subsequently, the obtained slurry was coated on copper foil, and an electrode for in-situ XRD measurement was obtained. Here, as the electrode, one with a diameter of 15 mm was used, and as a counter electrode, metal lithium was used. Note that, for a charge/discharge cell for the X-ray diffraction measurement, beryllium (Be) was used as a window application.

Between a silicon electrode and counter electrode lithium foil, which were thus fabricated, two porous membranes, each of which was made of polypropylene with a thickness of 20 µm, were interposed, and both of the electrodes were opposed to each other. Here, the silicon electrode was put on an upper surface (metal beryllium) of the charge/discharge cell for the X-ray diffraction measurement, an electrolytic solution was injected thereinto by using a syringe, and a spring and a spacer were stacked thereon. Thereafter, a lower portion of a charge/discharge cell for the X-ray diffraction measurement was superimposed on a resultant, whereby a battery was formed. Note that, for the electrolytic solution, one was used, which was obtained by dissolving lithium hexafluorophosphate ($LiPF_6$) into a mixed non-aqueous solvent so that a concentration of the lithium hexafluorophosphate concerned could be 1 M, the mixed non-aqueous solvent being obtained by mixing ethylene carbonate (EC) and diethyl carbonate (DEC) with each other in a volume ratio of 1:1. Then, a crystal structure change in a charge/discharge process was observed by the X-ray diffraction measurement. As charge conditions, a current rate was set at $\frac{1}{20}$ C, and a measurement mode was set at a constant current mode.

As understood from FIGS. 1(a) and 1(b), there is confirmed an increase of a half width of an X-ray diffraction peak, the increase following an increase of an energy density per unit weight, which is caused by enhancement of a charge depth. That is to say, a decrease of crystallinity, which results from occlusion of lithium, is recognized.

Figure 2:
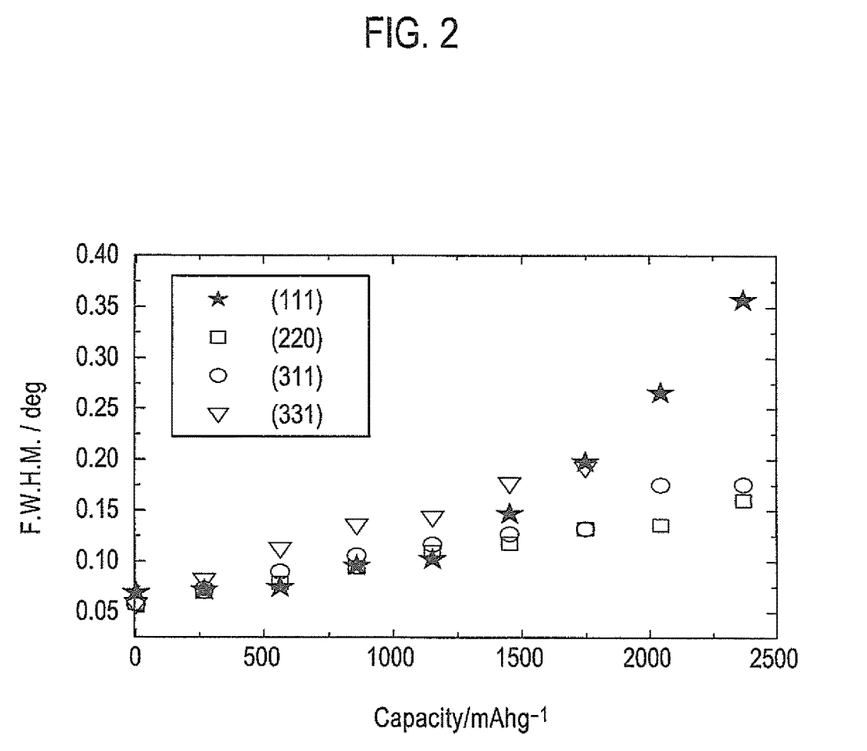
FIG. 2 is a graph showing changes of X-ray diffraction peak half widths, which are obtained from respective crystal planes of the silicon, with respect to a charge capacity.

FIG. 2 shows results of plotting changes of half widths (F. W. H. M./deg) of the respective crystal planes of silicon with respect to a charge capacity (Capacity/mAhg$^{-1}$). From this graph, there was confirmed a phenomenon that, when the charge capacity exceeds 1500 mAh/g, the half width is drastically increased only on the (111) crystal plane as a slip plane of the silicon. It is considered that such a drastic increase only on the (111) plane is caused by breakage of the silicon by cleavage, the breakage starting from the (111) plane.

Moreover, a cycle test was performed by using a coin cell fabricated by similar counter electrode, separator and electrolytic solution, the coin cell being fabricated by using a silicon negative electrode obtained in a similar way to the above. In this event, the current rate was set at $\frac{1}{3}$ C, a constant current-constant voltage mode was set at a charging time, a constant current mode was set at a discharging time, and individually in both cases, upper limit values of charge capacities were regulated.

Figure 3:
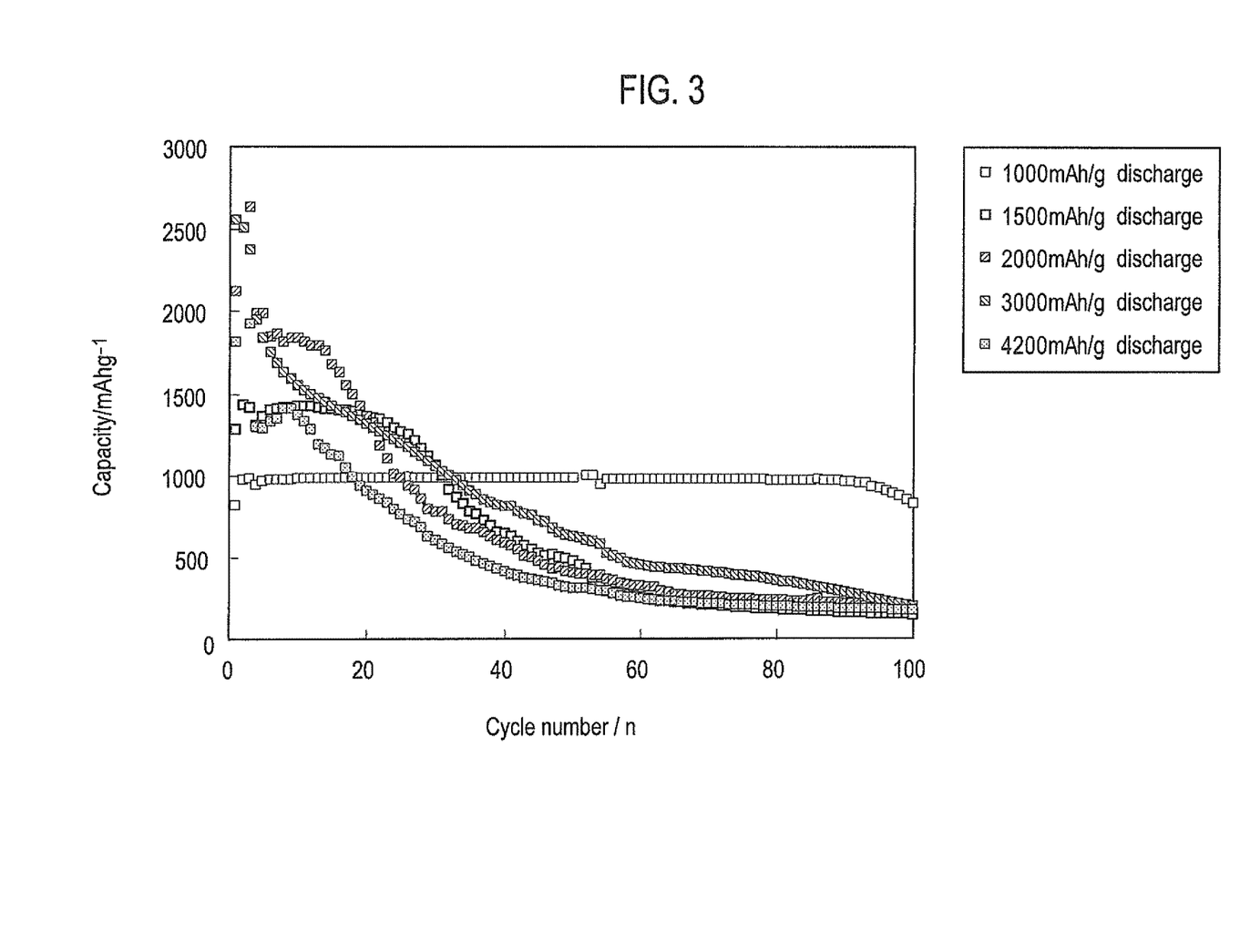
FIG. 3 is a graph showing relationships between upper limit values of the charge capacity and a cycle lifetime with regard to a battery using the silicon as a negative electrode active material.

From results of the above-described cycle test, which are shown in FIG. 3, it is understood that an upper limit value of a weight energy density affects a cycle lifetime. In particular, it is understood that, in a case where the weight energy density as the upper limit is set at 1000 mAh/g, a good cycle lifetime is exhibited. As opposed to this, it was confirmed that, in a case where the weight energy density is 1500 mAh/g or more, the cycle lifetime was shortened drastically. From this result, it is considered that the cycle lifetime is shortened by the drastic change of the X-ray diffraction peak of the silicon (111) plane, which is shown in FIG. 2, that is, by the breakage of the silicon, which starts from the (111) plane. That is to say, if the change of the (111) plane of the silicon, which is the slip plane, is controlled, then the cycle lifetime can be enhanced.

In the present invention, as the negative electrode active material for an electric device, one was used, which includes crystalline metal having a structure in which a size in a perpendicular direction to the crystal slip plane is 500 nm or less. As described above, a thickness of the crystalline metal in an orientation of the slip plane is controlled so as to become sufficiently small, and accordingly, the thickness in the orientation of the slip plane becomes small. Therefore, even if the breakage occurs from the slip plane concerned taken as the starting point, micronization of the crystalline metal is suppressed. As a result, a deterioration of the cycle lifetime can be prevented. Note that, in this specification, a value of the size of the crystalline metal in the perpendicular direction to the slip plane can be measured, for example, by using observing means such as a scanning electronic microscope (SEM).

Desirably, the above-described crystalline metal has an anisotropic structure. Note that, in the present invention, "anisotropic structure" stands for one in which sizes in three-dimensional directions are not isotropic but a size in only a specific direction is adjusted. Specifically, for example in a case of the silicon, the perpendicular direction to the (111) plane as the slip plane thereof is mentioned. As described above, the crystalline metal has the isotropic structure, whereby a particle fracture resulting from the crystal slip plane is suppressed. As a result, the deterioration of the cycle lifetime can be prevented more effectively.

Moreover, in the negative electrode active material of the present invention, from a viewpoint of the weight energy density, preferably, a size of the crystalline metal in a direction of the crystal slip plane is larger than the size thereof in the perpendicular direction to the crystal slip plane. In such a way, the number of crystal slip planes per particle can be reduced.

Furthermore, preferably, a cross-sectional shape of the crystalline metal in the perpendicular direction to the crystal slip plane is circular, triangular, square, rectangular, rhombic, trapezoidal or polygonal. By employing a shape as described above, it becomes easy to adjust binding properties with the conductive assistant and the binder and porosity of the electrode.

In the above description, as a typical example of the crystalline metal applicable as the negative electrode active material, silicon is exemplified. As the crystalline metal according to this embodiment, besides this, there can be employed germanium (Ge), tin (Sn), aluminum (Al), zinc (Zn), lead (Pb), antimony (Sb), magnesium (Mg), indium (In), bismuth (Bi) or cadmium (Cd).

In the present invention, one can be used, which contains the above-described metal as a main component by a ratio exceeding 98%. That is to say, the presence of impurities can be permitted if a ratio thereof is 2% or less. Moreover, in other words, the negative electrode active material in this embodiment can be defined to be one, which is made only of the crystalline metal having the structure in which the size in the perpendicular direction to the crystal slip plane is 500 nm or less, and of the inevitable impurities. As an element permitted as the inevitable impurities as described above, the above-described metals which exclude the main component metal can be mentioned. Besides the above, there can be mentioned titanium (Ti), vanadium (V), iron (Fe), boron (B), carbon (C), nitrogen (N), oxygen (O), fluorine (F), phosphorus (P), sulfur (S), chlorine (Cl), arsenic (As), selenium (Se), bromine (Br) and the like.

A negative electrode for an electric device according to the embodiment of the present invention includes the negative electrode active material for an electric device, which is as described above and is made of the crystalline metal having anisotropy. Then, an electric device according to the embodiment of the present invention includes the negative electrode active material as described above or the negative electrode for an electric device, which is as described above. As a representative example of the electric device as described above, a lithium ion secondary battery is mentioned below, and a description is made below of a configuration, materials and the like thereof.

Figure 6:
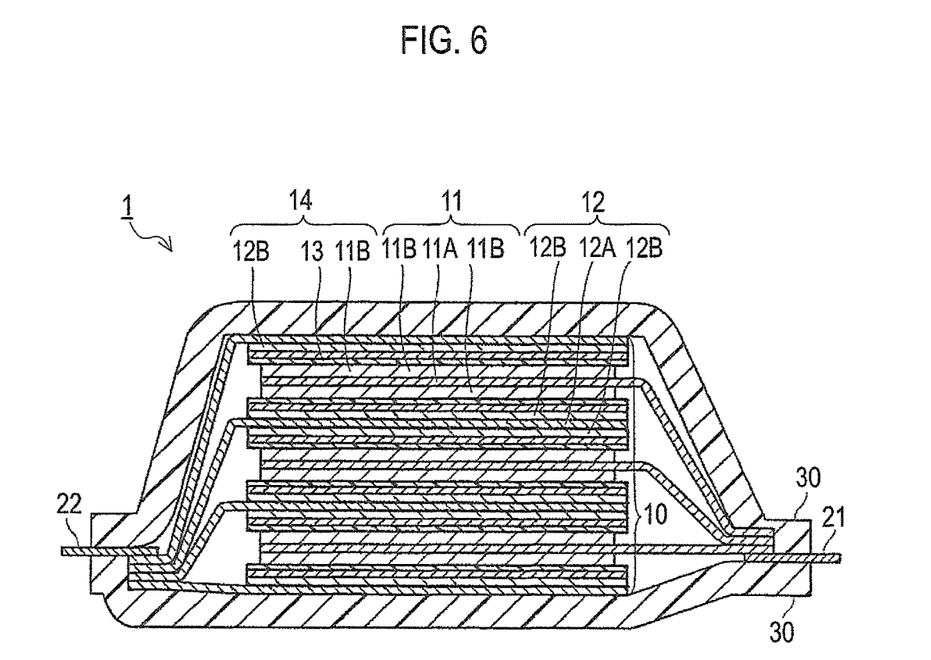
FIG. 6 is a schematic cross-sectional view showing an example of a lithium ion secondary battery according to an embodiment of the present invention.

FIG. 6 exemplifies a lithium ion secondary battery according to the embodiment of the present invention. As shown in FIG. 6, a lithium ion secondary battery 1 of this embodiment has a configuration, in which a battery element 10 attached with a positive electrode tab 21 and a negative electrode tab 22 is sealed in an inside of a package body 30. Then, each of positive electrodes is fabricated by coating a positive electrode active material and the like on a positive electrode current collector, and each of negative electrodes is fabricated by coating a negative electrode active material and the like on a negative electrode current collector. Note that, in this embodiment, the positive electrode tab 21 and the negative electrode tab 22 are drawn out from the inside of the package body 30 toward an outside thereof individually in directions opposite to each other. Moreover, though not shown, the lithium ion secondary battery 1 may have a configuration, in which the positive electrode tab and the negative electrode tab are drawn out from the inside of the package body to the outside thereof in the same direction. The positive electrode tab and the negative electrode tab can be attached to the positive electrode current collectors and the negative electrode current collectors, which will be described later, for example, by ultrasonic welding, resistance welding or the like.

(Positive Electrode Tab and Negative Electrode Tab)

For example, the positive electrode tab 21 and the negative electrode tab 22 are composed of a material such as aluminum (Al), copper (Cu), titanium (Ti), nickel (Ni), stainless steel (SUS), and alloys of these. However, the material of the positive electrode tab 21 and the negative electrode tab 22 is not limited to these, and materials, which have been heretofore known in public and can be used as such tabs for the lithium ion secondary battery, can be used. Note that, as the positive electrode tab and the negative electrode tab, those made of the same material may be used, or those made of different materials may be used. Moreover, the tabs prepared separately may be connected to the positive electrode current collectors and the negative electrode current collectors, which will be described later, as in this embodiment, or alternatively, in a case where the respective positive electrode current collectors and the respective negative electrode current collectors, which will be described later, have a form of foil, the tabs may be formed by extending the respective ones.

(Package Body)

Preferably, for example, the package body 30 is formed of a film-like package material from viewpoints of miniaturization and weight reduction. However, the package body 30 is not limited to this, and a package body can be used, which is formed of a material which has been heretofore known in public and is usable for the package body for the lithium ion secondary battery. Note that, in a case of applying the package body 30 to an automobile, for example, it is suitable to use polymer-metal composite laminated sheets, which are excellent in thermal conductivity, in order to efficiently transfer heat from a heat source of the automobile, and to rapidly heat up an inside of the battery to a battery operation temperature.

(Battery Element)

As shown in FIG. 6, the battery element 10 in the lithium ion secondary battery 1 of this embodiment has a configuration, in which a plurality of Single cell layers 14, each of which is composed of a positive electrode 11, an electrolyte layer 13 and a negative electrode 12, are laminated on one another. Each of the positive electrodes 11 has a configuration, in which positive electrode active material layers 11B are formed on both main surfaces of a positive electrode current collector 11A. Moreover, each of the negative electrodes 12 has a configuration, in which negative electrode active material layers 12B are formed on both main surfaces of a negative electrode current collector 12A.

At this time, the positive electrode active material layer 11B, which is formed on one of the main surfaces of the positive electrode current collector 11A in one positive electrode 11, and the negative electrode active material layer 12B, which is formed on one of the main surfaces of the negative electrode current collector 12A in the negative electrode 12 adjacent to the one positive electrode 11, face each other while interposing the electrolyte layer 13 therebetween. In such a way, pluralities of the positive electrodes, the electrolyte layers and the negative electrodes are laminated on one another in this order, and the positive electrode active material layer 11B, the electrolyte layer 13 and the negative electrode active material layer 12B compose one single cell layer 14. That is to say, the lithium ion secondary battery 1 of this embodiment comes to have a configuration, in which the plurality of Single cell layers 14 are connected electrically in parallel to one another by being laminated on one another. Note that, on each of the negative electrode current collectors 12A located on outermost layers of the battery element 10, the negative electrode active material layer 12B is formed on only one surface thereof.

Moreover, on outer circumferences of the single cell layers 14, insulating layers (not shown) may be provided in order to insulate the positive electrode current collectors 11A and the negative electrode current collectors 12A, which are adjacent to each other, from each other. Preferably, on the outer circumferences of the single cell layers, the insulating layers as described above are formed of a material, which holds an electrolyte contained in the electrolyte layers and the like, and prevents liquid leakage of the electrolyte. Specifically, general-purpose plastics such as polypropylene (PP), polyethylene (PE), polyurethane (PUR), polyamide-based resin (PA), polytetrafluoroethylene (PTFE), polyvinylidene fluoride (PVdF) and polystyrene (PS) can be used. Moreover, thermoplastic olefin rubber, silicon rubber and the like can also be used.

(Positive Electrode Current Collector and Negative Electrode Current Collector)

For example, the positive electrode current collectors 11A and the negative electrode current collectors 12A are made of a conductive material such as foil-like or mesh-like aluminum, copper and stainless steel (SUS). However, the material concerned is not limited to these, and materials, which have been heretofore known in public and are usable as current collectors for the lithium ion secondary battery, can be used. Moreover, a size of the current collectors can be determined in response to a usage purpose of the battery. For example, if the current collectors are used for a large battery for which a high energy density is required, then current collectors with a large area are used. A thickness of the current collectors is not particularly limited, either. In usual, the thickness of the current collectors approximately ranges from 1 to 100 μm. A shape of the current collectors is not particularly limited, either. In the battery element 10 shown in FIG. 6, besides current collector foil, those with a mesh pattern (expand grid and the like) and the like can be used. Note that, in a case where a thin film alloy that serves as the negative electrode active material is directly formed on the negative electrode current collectors 12A by a sputtering method and the like, it is desirable to use the current collector foil.

Such a material that composes the current collectors is not particularly limited. For example, metal can be employed, and resin can be employed, in which conductive filler is added to a conductive polymer material or a non-conductive polymer material. Specifically, as the metal, there are mentioned aluminum, nickel, iron, stainless steel, titanium, copper and the like. Besides these, it is preferable to use a clad material of nickel and aluminum, a clad material of copper and aluminum, a plating material in which these metals are combined with one another, and the like. Moreover, the metal may be foil in which aluminum is coated on a surface of the metal. Among them, aluminum, stainless steel, copper and nickel are preferable from viewpoints of the electron conductivity, a battery operation potential, adhesion properties of the negative electrode active material by sputtering thereof to the current collectors, and the like.

Moreover, as the conductive polymer material, for example, there are mentioned polyaniline, polypyrrole, polythiophene, polyacetylene, polyparaphenylene, polyphenylene vinylene, polyacrylonitrile, polyoxadiazole and the like. Such conductive polymer materials have sufficient conductivity even if the conductive filler is not added thereto, and accordingly, are advantageous in a point of facilitation of the manufacturing process or of weight reduction of the current collectors.

As the non-conductive polymer material, for example, there are mentioned polyethylene (PE: high-density polyethylene (HDPE), low-density polyethylene (LDPE) and the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinylidene chloride (PVC), polyvinylidene fluoride (PVdF), polystyrene (PS), and the like. Such non-conductive polymer materials have excellent potential resistance and solvent resistance.

According to needs, the conductive filler can be added to the conductive polymer material or the non-conductive polymer material, which is described above. In particular, in a case where resin that serves as a base material of the current collectors is composed of only the non-conductive polymer, the conductive filler becomes essential in order to impart the conductivity to the resin. As long as being a material having the conductivity, the conductive filler can be used without receiving limitations in particular. For example, as a material excellent in conductivity, potential resistance or lithium ion barrier properties, there are mentioned metal, conductive carbon and the like. The metal is not particularly limited; however, preferably, includes at least one metal selected from the group consisting of Ni, Ti, Al, Cu, Pt, Fe, Cr, Sn, Zn, In, Sb and K, or alloys or metal oxides, which include these metals. Moreover, the conductive carbon is not particularly limited; however, preferably, includes at least one selected from the group consisting of acetylene black, Vulcan (registered trademark), Black Pearl (registered trademark), carbon nanofiber, Ketjen Black (registered trademark), carbon nanotube, carbon nano-horn, carbon nano-balloon and fullerene. A loading amount of the conductive filler is not particularly limited as long as being an amount by which sufficient conductivity can be imparted to the current collectors, and in general, approximately ranges from 5 to 35 mass %.

However, the current collectors are not limited to these, and materials, which have been heretofore known in public and are used as the current collectors for the lithium ion secondary battery, can be used.

(Positive Electrode)

In the lithium ion secondary battery, each of the positive electrodes 11 is composed in such a manner that the positive electrode active material layers 11B are formed on one surface or both surfaces of the positive electrode current collector 11A made of the conductive material such as aluminum foil, copper foil, nickel foil and stainless steel foil. As mentioned above, the thickness of each of the positive electrode current collectors is not particularly limited; however, in general, approximately ranges from 1 to 30 μm.

Each of the positive electrode active material layers 11B contains one or two or more of positive electrode materials, which are capable of occluding and discharging lithium, as such positive electrode active materials, and may contain a conductive assistant and a binder according to needs. Note that a compounding ratio of these positive electrode active material, conductive assistant and binder in the positive electrode active material layer is not particularly limited.

As the positive electrode active material, for example, there are mentioned: a lithium-transition metal composite oxide; a lithium-transition metal phosphate compound; a lithium-transition metal sulfate compound; those with a solid solution base, a ternary base, a NiMn base, a NiCo base and a spinel Mn base; and the like.

As the lithium-transition metal composite oxide, for example, there can be mentioned $LiMn_2O_4$, $LiCoO_2$, $LiNiO_2$, $Li(Ni,Mn,Co)O_2$, $Li(Li,Ni,Mn,Co)O_2$, $LiFePO_4$, and the like. Moreover, those can also be employed, in which other elements are partially substituted for the transition metals of these composite oxides. As such a solid solution-based positive electrode active material, there are mentioned: $xLiMO_2 \cdot (1-x)Li_2NO_3$ ($0<x<1$, M is one or more of transition metals in which an average oxidation state is 3+; N is one or more of transition metals in which an average oxidation state is 4+), $LiRO_2$-$LiMn_2O_4$ (R=transition metal element such as Ni, Mn, Co and Fe); and the like.

As such a ternary-based positive electrode active material, a nickel/cobalt/manganese-based composite positive electrode material and the like are mentioned. Moreover, as NiMn-based positive electrode active material, $LiNi_{0.5}Mn_{1.5}O_4$ and the like are mentioned. As such a NiCo-based positive electrode active material, $Li(NiCo)O_2$ and the like are mentioned. Depending on cases, two or more of the positive electrode active materials may be used in combination. From viewpoints of a capacity and output characteristics, the lithium-transition metal composite oxide is suitably used as the positive electrode active material.

Note that a particle diameter of the above-described positive electrode active material is not particularly limited; however, desirably, is smaller in general. Moreover, in consideration of working efficiency, handling easiness and the like, a mean particle diameter of the positive electrode active material just needs to approximately range from 1 to 30 µm, more preferably, approximately ranges from 5 to 20 µm. Moreover, as a matter of course, positive electrode active materials other than those described above can also be employed. In a case where such particle diameters, which are optimum in an event where the respective active materials develop effects intrinsic thereto, are different from one another, the active materials just need to be blended and used while setting the particle diameters optimum in the event of developing the effects individually intrinsic thereto. That is to say, it is not necessarily necessary to uniform the particle diameters of all of the active materials.

The binder is added for the purpose of maintaining an electrode structure by binding the active materials to each other or the active material and the current collector to each other. As the binder as described above, there can be used: thermoplastic resins such as polyvinylidene fluoride (PVDF), polytetrafluoroethylene (PTFE), polyvinyl acetate, polyimide (PI), polyamide (PA), polyvinyl chloride (PVC), polymethyl methacrylate (PMA), polymethyl methacrylate (PMMA), polyether nitrile (PEN), polyethylene (PE), polypropylene (PP) and polyacrylonitrile (PAN); thermosetting resins such as epoxy resin, polyurethane resin, and urea resin; and a rubber-based material such as styrene butadiene rubber (SBR).

The conductive assistant is also simply referred to as a conductive agent, and stands for a conducive additive to be blended in order to enhance the conductivity of the positive electrode active material. The conductive assistant to be used in the present invention is not particularly limited, and those heretofore known in public can be used. For example, there can be mentioned carbon materials such as: carbon black including acetylene black; graphite; and carbon fiber. The conductive assistant is contained in the positive electrode active material, whereby an electron network in the inside of such an active material layer is formed effectively, and contributes to the enhancement of the output characteristics of the battery and to enhancement of reliability by enhancement of liquid retention for the electrolytic solution.

(Negative Electrode)

Meanwhile, in a similar way to the positive electrode, each of the negative electrodes 12 is composed in such a manner that the negative electrode active material layers 12B are formed on one surface or both surfaces of the negative electrode current collector 12A made of the conductive material as described above.

The negative electrode active material layer 12B contains one or two or more of negative electrode materials, which are capable of occluding and discharging lithium, as such negative electrode active materials, and may contain the conductive assistant and the binder according to needs in a similar way to the case of the above-described positive electrode active material. Note that a compounding ratio of these negative electrode active material, conductive assistant and binder in the negative electrode active material layer is not particularly limited.

In the lithium ion secondary battery as the electric device of this embodiment, a negative electrode active material is used, which has anisotropy, and is made of the crystalline metal in which the size in the perpendicular direction to the crystal slip plane is 500 nm or less. As described above, as the negative electrode, one is used, in which the negative electrode active material layer is formed by coating, on the surface of the current collector, slurry containing the conductive assistant and the binder together with the negative electrode active material as described above.

Note that, as it is described above that each of the positive electrode active material layer and the negative electrode active material layer is formed on one surface or both surfaces of each of the current collectors, the positive electrode active material layer and the negative electrode active material layer can also be formed on one surface and other surface in one current collector, respectively. Such an electrode can be applied to a bipolar battery.

(Electrolyte Layer)

Each of the electrolyte layers 13 is a layer containing a non-aqueous electrolyte, and the non-aqueous electrolyte has a function as a carrier of lithium ions which move between the positive electrode and the negative electrode at the time of charge/discharge. Note that, suitably, a thickness of the electrolyte layer 13 is thinner from a viewpoint of reducing internal resistance thereof, approximately ranges from 1 to 100 µm in usual, and preferably, ranges from 5 to 50 µm.

Note that the non-aqueous electrolyte to be contained in the electrolyte layers 13 is not particularly limited as long as being capable of exerting the function as the carrier of the lithium ions, and a liquid electrolyte or a polymer electrolyte can be used.

The liquid electrolyte has a configuration, in which lithium salt (electrolyte salt) is dissolved into an organic solvent. As the organic solvent, for example, there are mentioned carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC) and methyl propyl carbonate (MPC). Moreover, as the lithium salt, compounds capable of being added to the electrode active material layers can be used, the compounds including $Li(CF_3SO_2)_2N$, $Li(C_2F_5SO_2)_2N$, $LiPF_6$, $LiBF_4$, $LiAsF_6$, $LiTaF_6$, $LiClO_4$, $LiCF_3SO_3$ and the like.

Meanwhile, the polymer electrolyte is classified into a gel polymer electrolyte (gel electrolyte) that contains the electrolytic solution and into an intrinsic polymer electrolyte that does not contain the electrolytic solution. The gel polymer electrolyte has a configuration composed in such a manner that the above-described liquid electrolyte is injected into a matrix polymer (host polymer), preferably, made of an ion conductive polymer. The gel polymer electrolyte is used as the electrolyte, whereby fluidity of the electrolyte is eliminated, it becomes easy to shut off ion conduction between the respective layers, and the gel polymer electrolyte is excellent in this point.

The ion conductive polymer to be used as the matrix polymer (host polymer) is not particularly limited, and for example, as the ion conductive polymer, there are mentioned: polyethylene oxide (PEO); polypropylene oxide (PPO); polyvinylidene fluoride (PVDF); a copolymer of polyvinylidene fluoride and hexafluoropropylene (PVDF-HFP); polyethylene glycol (PEG), polyacrylonitrile (PAN), polymethyl methacrylate (PMMA) and copolymers of these; and the like.

Here, the above-described ion conductive polymer may be the same as or different from the ion conductive polymer to be used as the electrolyte in the active material layers; however, preferably, is the same. A type of the electrolytic solution, that is, types of the lithium salt and the organic solvent are not particularly limited, and electrolyte salt such as the above-described lithium salt and an organic solvent of the carbonates or the like are used.

The intrinsic polymer electrolyte is one composed in such a manner that the lithium salt is dissolved into the above-described matrix polymer, and does not contain the organic solvent. Hence, the intrinsic polymer electrolyte is used as the electrolyte, whereby a concern about the liquid leakage from the battery is eliminated, and the reliability of the battery is enhanced.

The matrix polymer of the gel polymer electrolyte or the intrinsic polymer electrolyte forms a crosslinked structure, and can thereby develop excellent mechanical strength. In order to form the crosslinked structure as described above, a polymerizable polymer (for example, PEO and PPO) for forming the polymer electrolyte just needs to be subjected to polymerization treatment by using an appropriate polymerization initiator. As the polymerization treatment, thermal polymerization, ultraviolet polymerization, radiation polymerization, electron beam polymerization and the like can be used. Note that the non-aqueous electrolyte contained in the electrolyte layer 13 may be one made only of one type or may be one obtained by mixing two or more types with one another.

Moreover, in a case where the electrolyte layer 13 is composed of the liquid electrolyte or the gel polymer electrolyte, it is preferable to use a separator for the electrolyte layer 13. As a specific form of the separator, for example, a microporous membrane made of polyolefin such as polyethylene and polypropylene is mentioned.

[Shape of Battery]

The lithium ion secondary battery has a structure, in which the battery element is housed in a battery case such as a can body and a laminated container (package body). The battery element (electrode structure) is composed in such a manner that the positive electrode and the negative electrode are connected to each other while interposing the electrolyte layer therebetween. Note that the battery is roughly classified into a wound-type battery in which the battery element has a structure in which the positive electrode, the electrolyte layer and the negative electrode are wound, and into a laminated-type battery in which the positive electrode, the electrolyte layer and the negative electrode are laminated on one another, and the above-mentioned bipolar battery has a laminated-type structure. Moreover, the battery is also sometimes referred to as a so-called coin cell, a button battery, a laminated battery and the like in response to the shape and structure of the battery case.

EXAMPLES

A description is made below in detail of the present invention based on examples. Note that the present invention is not limited to these examples.

[1] Preparation of Negative Electrode Active Material

At room temperature, silver nanoparticles were precipitated on a silicon wafer by using a mixed solution made of hydrofluoric acid, silver nitrate and water. Subsequently, etching was performed by the MAE (Metal Assist Etching) method, and a size of a slip plane in a silicon crystal serving as the negative electrode active material was roughly controlled. Thereafter, a surface of a structure thus obtained was oxidized at 1000° C. in an oxygen atmosphere. Subsequently, silicon oxide was removed by hydrofluoric acid, whereby a size of the negative electrode active material in the perpendicular direction to the slip plane was controlled precisely.

In such a manner as described above, negative electrode active materials were obtained, in which a size in the perpendicular direction to the crystal slip plane was individually 75 μm, 45 μm, 20 μm, 0.5 μm, 0.05 μm and 0.002 μm. Note that, in each of these negative electrode active materials, a cross-sectional shape thereof in the perpendicular direction to the crystal slip plane was polygonal. Moreover, when L1 was the size in the perpendicular direction to the crystal slip plane, and L2 was a size of each of the negative electrode active materials in a direction of the crystal slip plane, the negative electrode active material was prepared so that a relationship of L1/L2<1 could be established.

Figure 4:
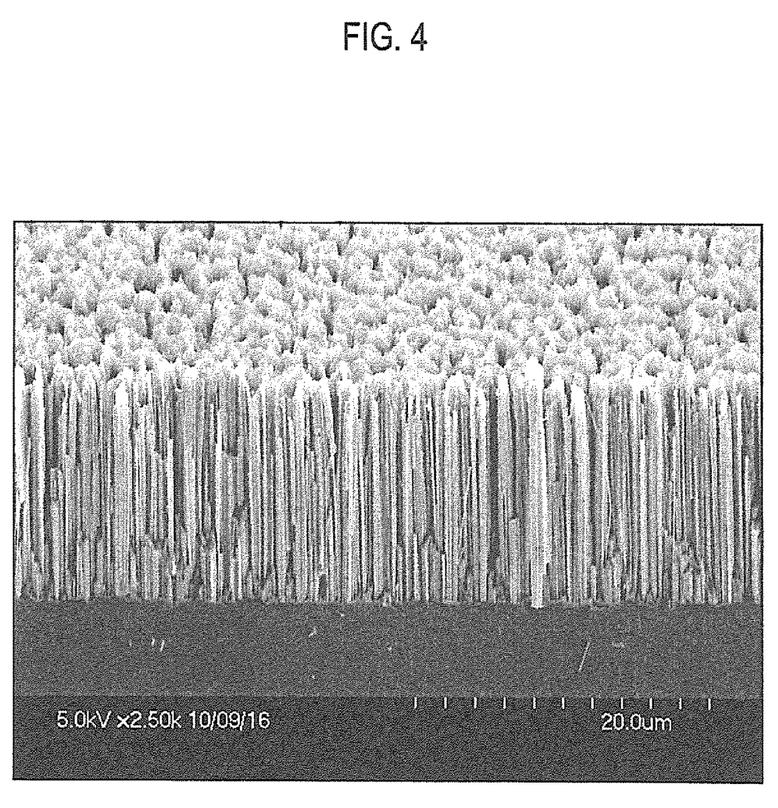
FIG. 4 is a SEM image showing a shape example of needle-like silicon.

FIG. 4 shows an SEM image of a representative example, and as understood from this drawing, a size of the negative electrode active material in a short side direction is approximately 500 nm on the average. In an event of the etching, etching treatment was ended when a size of the silicon crystal in a longitudinal direction became a desired size. Finally, these pieces of needle-like silicon were peeled from the silicon wafer, whereby powder-like negative electrode active materials with the above-described respective sizes were obtained.

[2] Fabrication of Negative Electrode

Negative electrodes were fabricated by individually using these types of the silicon-made powder-like negative electrode active materials obtained in the manner described above. That is to say, each of the negative electrode active materials concerned, the conductive assistant (carbon black) and the binder (polyvinylidene fluoride) were mixed with one another in a mass ratio of 80:5:15, and a mixture thus obtained was diluted with N-methyl-2-pyrrolidone (NMP), whereby slurry of each thereof was prepared. The obtained slurry was coated on copper foil, and was dried, whereby each of negative electrodes with a diameter of 15 mm was obtained.

[3] Fabrication of Battery

Between each of the negative electrodes obtained in the manner described above and lithium foil as the counter electrode, two porous membranes made of polypropylene with a thickness of 20 μm were interposed, and then both of the electrodes were opposed to each other. Subsequently, such a laminated body was superimposed on a bottom portion of a coil cell, and a gasket was mounted thereon in order to keep insulating properties between electrodes. Thereafter, an electrolytic solution was injected by using a syringe. Then, after a spring and a spacer were stacked, an upper portion of the coil cell was superimposed and crimped, whereby each of batteries was obtained. Note that, as the electrolytic solution, one was used, which was obtained by dissolving $LiPF_6$ (lithium hexafluorophosphate) into a mixed non-aqueous solvent so that a concentration of the lithium hexafluorophosphate concerned could be 1 M, the mixed non-aqueous solvent being obtained by mixing ethylene carbonate (EC) and diethyl carbonate (DEC) with each other in a volume ratio of 1:1.

[4] Charge/Discharge Cycle Durability Test

Figure 5:
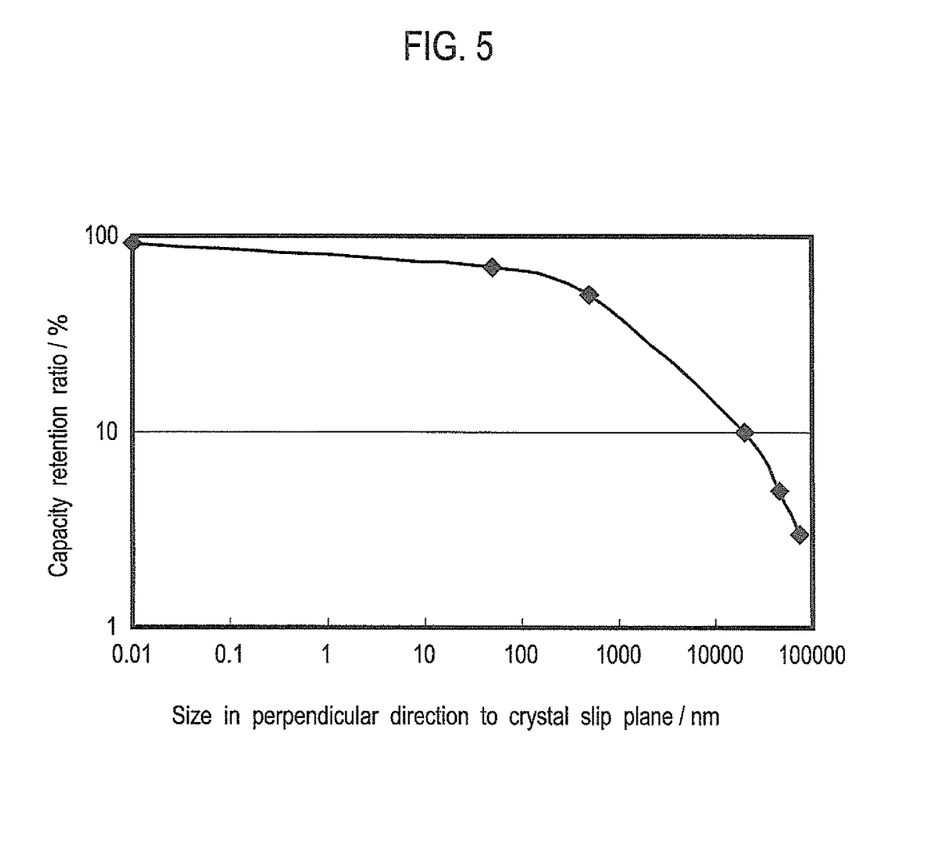
FIG. 5 is a graph showing an influence of a size of a silicon active material in a perpendicular direction to the slip plane, the influence affecting a capacity retention of a cell using the silicon active material.

For each of such coin cells obtained in the manner described above, the following charge/discharge test was implemented. That is to say, by using a charge/discharge tester (HJ051SM8A made by Hokuto Denko Corporation), the charge/discharge test was implemented at a current rate of ⅓ C in a thermostat oven (PFU-3K made by Espec Corporation set at a temperature of 300 K (27° C.). Note that, in the charge process, the constant current-constant voltage mode was set, and the charge was performed from 2V to 10 mV at 0.1 mA. In the discharge process, the constant current mode was set, and the discharge was performed from 10 mV to 2V at 0.1 mA. A charge/discharge cycle described above was taken as one cycle, and this was repeated 50 times. Then, a discharge capacity in a 50th cycle was obtained, and a capacity retention ratio thereof with respect to a discharge capacity in a first cycle was calculated. Results of this are shown in FIG. 5. Note that the discharge capacity retention ratio is calculated by (discharge capacity in 50th cycle)/(discharge capacity in first cycle)×100. Moreover, as the discharge capacity, a value calculated per alloy weight is employed.

[5] Test Results

From FIG. 5, it is understood that the size of the silicon crystal in the perpendicular direction to the slip plane, the silicon crystal serving as the negative electrode active material, affects the capacity retention ratio. That is to say, it was confirmed that the capacity retention ratio is enhanced as the size in the perpendicular direction to the slip plane is being smaller. If the size in the perpendicular direction to the slip plane exceeds 500 nm on the average, then such a decrease of the capacity retention ratio in the cycle durability is remarkable. Hence, preferably, the size in the perpendicular direction to the slip plane is 500 nm or less on the average. Moreover, it is recognized that the capacity retention ratio tends to be enhanced as the size in the perpendicular direction to the slip plane is being smaller. It is understood that, in particular, in a case where the size is 100 nm or less, then the capacity retention ratio is remarkably high.

The description has been made above of the contents of the present invention along the examples; however, the present invention is not limited to the description of these, and for those skilled in the art, it is self-obvious that a variety of modifications and improvements are possible.

In accordance with the present invention, as the negative electrode active material for an electric device, there is used the one made of the crystalline metal having the structure in which the size in the perpendicular direction to the crystal slip plane is 500 nm or less. As described above, the thickness in the orientation of the slip plane is controlled so as to become sufficiently small, and accordingly, the micronization of the crystalline metal is suppressed even if the breakage occurs from the slip plane concerned taken as the starting point. Hence, the deterioration of the cycle lifetime can be prevented by applying the negative electrode active material for an electric device, which is as described above, or the negative electrode using the same, to the electric device, for example, such as the lithium ion secondary battery.

The invention claimed is:

1. A negative electrode active material for an electric device comprising needle-like silicon material having a size of 500 nm or less in a perpendicular direction to a crystal slip plane (111),
    wherein a size of the needle-like silicon material in a direction of the crystal slip plane is larger than the size in the perpendicular direction to the crystal slip plane.

2. The negative electrode active material for an electric device according to claim 1, wherein the size in the perpendicular direction to the crystal slip plane is 100 nm or less.

3. The negative electrode active material for an electric device according to claim 1, wherein a three-dimensional size of the needle-like silicon material has anisotropy.

4. The negative electrode active material for an electric device according to claim 1, wherein a cross-sectional shape of the needle-like silicon material in the perpendicular direction to the crystal slip plane is circular, triangular, square, rectangular, rhombic, trapezoidal or polygonal.

5. A negative electrode for an electric device comprising the negative electrode active material for an electric device according to claim 1.

6. An electric device comprising the negative electrode for an electric device according to claim 5.

7. An electric device comprising the negative electrode active material for an electric device according to claim 1.

8. The electric device according to claim 7, wherein the electric device is a lithium ion secondary battery.

9. The negative electrode active material for an electric device according to claim 1, wherein a cross-sectional shape of the needle-like silicon material in the perpendicular direction to the crystal slip plane is triangular, square, rectangular, rhombic, trapezoidal, or polygonal.

10. A negative electrode for an electric drive comprising:
    a current collector consisting essentially of a metal, or composed of a conductive polymer material, or composed of a resin in which a conductive filler is added to a conductive polymer material or a non-conductive polymer material; and
    a negative electrode active material consisting essentially of needle-like silicon material having a size of 500 nm or less in a perpendicular direction to a crystal slip plane (111),
    wherein a size of the needle-like silicon material in a direction of the crystal slip plane is larger than the size in the perpendicular direction to the crystal slip plane.

* * * * *